(12) United States Patent
Schmitt et al.

(10) Patent No.: US 10,668,568 B2
(45) Date of Patent: Jun. 2, 2020

(54) PLASTIC COMPONENT AND METHOD FOR GENERATING A SURFACE STRUCTURE ON A PLASTIC COMPONENT

(71) Applicant: Gerresheimer Regensburg GmbH, Regensburg (DE)

(72) Inventors: Bernhard Schmitt, Wackersdorf (DE); Dominik Will, Fichtelberg (DE); Daniel Schwab, Amberg (DE)

(73) Assignee: Gerresheimer Regensburg GmbH, Regensburg (DE)

( * ) Notice: Subject to any disclaimer, the term of this patent is extended or adjusted under 35 U.S.C. 154(b) by 246 days.

(21) Appl. No.: 15/786,895

(22) Filed: Oct. 18, 2017

(65) Prior Publication Data

US 2018/0104766 A1   Apr. 19, 2018

(30) Foreign Application Priority Data

Oct. 18, 2016   (DE) .................. 10 2016 119 760

(51) Int. Cl.
| | | |
|---|---|---|
| *B23K 26/00* | (2014.01) | |
| *B29C 45/26* | (2006.01) | |
| *B23K 26/352* | (2014.01) | |
| *B23K 26/354* | (2014.01) | |
| *B29C 45/37* | (2006.01) | |
| *B29C 33/38* | (2006.01) | |
| *B44B 5/00* | (2006.01) | |
| *B29C 59/02* | (2006.01) | |

(52) U.S. Cl.
CPC ...... *B23K 26/3576* (2018.08); *B23K 26/0006* (2013.01); *B23K 26/354* (2015.10); *B29C 33/3857* (2013.01); *B29C 45/2602* (2013.01); *B29C 45/372* (2013.01); *B44B 5/0052* (2013.01); *B29C 2059/023* (2013.01); *B44B 5/0019* (2013.01)

(58) Field of Classification Search
CPC .............. B23K 26/3576; B23K 26/354; B23K 26/0006; B29C 45/2602; B29C 45/372; B29C 33/3857; B44B 5/0052
See application file for complete search history.

(56) References Cited

U.S. PATENT DOCUMENTS

| | | |
|---|---|---|
| 6,434,897 B1 | 8/2002 | Sievers et al. |
| 2005/0003146 A1 | 1/2005 | Spath |
| 2005/0049716 A1 | 3/2005 | Wagener et al. |

(Continued)

FOREIGN PATENT DOCUMENTS

| | | |
|---|---|---|
| DE | 19518270 C1 | 8/1996 |
| DE | 10130392 A1 | 1/2003 |

(Continued)

*Primary Examiner* — Mathieu D Vargot
(74) *Attorney, Agent, or Firm* — Muncy, Geissler, Olds & Lowe, P.C.

(57) ABSTRACT

A plastic component is provided that leads to an initial friction reduction with a friction partner. At least part of the surface of the plastic component, which interacts with a surface of a friction partner, is provided with a plurality of structures. The structures are composed of at least one structure type. Between two adjacent structure types, a distance is formed in the range of 10 microns to 1 mm. A width of the structure types is in the range of 10 microns to 100 microns. A height or depth of the structure types is in the range from 1 micron to 100 microns.

10 Claims, 6 Drawing Sheets

(56) References Cited

U.S. PATENT DOCUMENTS

2012/0104637 A1    5/2012  Daehnert et al.
2014/0272329 A1*   9/2014  McCollum ........... G02B 6/0065
                                              428/195.1

FOREIGN PATENT DOCUMENTS

DE    102010017357 A1    1/2003
DE    102009019762 A1   11/2010
EP         1063071 A2   12/2000
WO     WO03/044383 A1    5/2003

* cited by examiner

PLASTIC COMPONENT AND METHOD FOR GENERATING A SURFACE STRUCTURE ON A PLASTIC COMPONENT

This nonprovisional application claims priority under 35 U.S.C. § 119(a) to German Patent Application No. 10 2016 119 760.2, which was filed in Germany on Oct. 18, 2016, and which is herein incorporated by reference.

BACKGROUND OF THE INVENTION

Field of the Invention

The invention relates to a plastic component. The surface structure of the plastic component is particularly suitable for friction reduction (initial friction) between the plastic component and a friction partner interacting with the plastic component. The invention also relates to a method for producing the surface structure on at least a part of the surface of a plastic component.

Description of the Background Art

For the production of plastic parts with defined surface structures, there are currently basically two solutions which are used for microstructuring an inserted part for a tool for producing moldings of a plastic component by means of injection molding. One possibility for the production of microstructures in an insert is ultra-precision milling. Ultra-precision milling is analogous to normal milling processes. However, very high speeds and very delicate milling cutters are used in ultra-precision milling. As a result, there is a risk that the milling cutter could break. The cost of oscillation damping is considerable. Normal and very good commercial machines cannot meet the needs in this area. Investment in these technologies would be in the millions.

Another way to microstructure an insert for an injection mold is the LIGA process. Here, a lithographic process is followed by galvanic molding. The inserts for injection molds generated thereby are very accurate and are also suitable for mass production (e.g., of CDs), but the fatigue strength of these inserts is limited to approximately 100,000 shots. Very large quantities in the range of a few hundred million pieces cannot be produced without considerable effort.

The German patent application DE 10 2009 019 762, which corresponds to US 2012/0104637, discloses a method for producing objects with a defined, structured surface. On a carrier, a liquid plastic layer is applied, which is curable by way of energy input. By applying defined energy at predefined locations of the liquid plastic layer, a targeted structure height can be set and adjusted.

The German patent application DE 10 2010 017 357 A1 discloses a method for the production of bodies with micro- and/or nano-structured surfaces. An end of an embossing tool made of diamond, hard metal, glass or ceramic is provided. The embossing tool is thereby pressed onto different points on the surface of the body. Dimples are impressed and/or holes are created at the press-on sites. The embossing tool can be used with arbitrarily shaped ends, and arbitrarily shaped bodies can be provided with dimples.

The international patent application WO 03/044383 A1, which corresponds to US 2005/0049716, discloses a bearing, the application of an at least partially nanoscopically rough bearing surface, and a method for manufacturing a bearing having a nanoscopically rough bearing surface. An improvement of the bearing characteristics—minimization of particle formation and reduction of friction—is achieved in that the bearing surface is at least partially formed in a nanoscopically rough manner. This is done in particular by etching the bearing surface. Here, "micro-rough" shall be understood as such a rough—preferably reaching up to the micron range—formation of the surface, so that particles, preferably of up to 1 micron or even up to 10 microns, can be at least partially accommodated by surface dimples and can in particular be stored therein. The dimples or protrusions are preferably arranged irregularly distributed over the bearing surface at least in the micro-rough area, wherein the adjacent dimples are preferably also separated from each other by irregularly shaped protrusions.

The European patent application EP 1 063 071 A2 relates to a vehicle tire having side walls, of which the surface is provided at least in part with a microstructure. The microstructure is composed of micro protrusions, which have a height of 10 to 20 µm and are arranged at a mutual distance of up to 25 µm. The material in which the microstructures are incorporated is an elastomer. The microstructures formed on the tire are not suitable for interaction with a friction partner.

The German Patent DE 195 18 270 C1 discloses a non-slip floor covering, in particular made of mineral materials such as stone or granite, with a highly polished surface, and a method for producing such non-slip floor coverings. The surface of the floor covering is slip-proof because lens-shaped, sharp-edged dimples that are as flat as possible (micro-craters with suction action) and are invisible to the human eye are statistically distributed but irregularly arranged thereon. These micro-craters with suction action are obtained by means of a specific and defined action of laser pulses. The teaching of this document leads away from the present invention because the static friction is increased by the teachings herein. As a result, the friction (stiction) with a friction partner is reduced due to the microstructuring on the thermoplastic plastic component.

So far, several solutions exist that can lead to the control or defined adjustment of the friction between two friction partners. The reduction of friction between two friction partners can be achieved on the one hand by suitable material selection or by the addition of friction-reducing substances. Likewise, a defined microstructuring can be performed to increase the friction between two friction partners.

By suitably pairing the substances of the two friction partners, such as, e.g., polyoxylmethylene (POM) or polybutylene terephthalate (PBT), and by employing a targeted prevention of unfavorable constellations such as, e.g. pairing like substances, the friction can be overall reduced. The disadvantage is that up until the formation of a lubricating film between the two friction partners, the initial friction from the abraded material is increased.

Slip additives added to the base material of the plastic component can reduce friction. Polytetrafluoroethylene (PTFE) is the material with the lowest surface energy and can be blended into the base material of the plastic component. The reduction in friction is significant, but the PTFE must be removed from the base material by way of abrasion. PTFE-lubricated types also show high friction at initial use, which then greatly decreases after a few load cycles. If a uniformly defined friction across all load cycles is required, PTFE can complicate the situation. Further, the blending of PTFE in the base material of the plastic component leads to greater expense and may entail a change in the mechanical properties, even at a high proportion (such as 20%). A radiation sterilization of PTFE-containing plastic components must be tested for biocompatibility, because there is a risk of releasing short, fluorinated molecular fragments.

Another way to reduce the initial friction is by adding silicone. Silicone can be used as an additive, especially when low initial friction is required. Silicone can migrate to the surface of the material or plastic component and form initial lubrication there. Most often, silicone is used in conjunction with PTFE in order to achieve a more uniform reduction in friction. The disadvantage is difficulty in obtaining medical approval for the additive, as well as possible influences on other process steps, such as printing, gluing, etc., in which surface adhesion is necessary.

Additionally, cup structures in the surface of a plastic component can be introduced to reduce the friction, wherein the cup structures can serve as lubricant reservoirs. Here, too, there is the disadvantage that a further additive is used in the plastic component, so that the compatibility with a drug, which, for example, could come into contact with surfaces of plastic components modified accordingly, must be tested. Drugs can exhibit undesired side effects in interaction with, e.g., liquid silicones.

SUMMARY OF THE INVENTION

It is therefore an object of the invention to design a plastic component that is disposed on a contact surface to a possible friction partner in such a way that without the use of additional friction-reducing additives, at least the initial stiction between the plastic component and the friction partner is reduced.

Another object of the invention is to provide a method wherein on at least part of the surface of a plastic component, a surface structure is formed, which reduces at least an initial static friction between the plastic component and a friction partner.

This object is achieved in an exemplary embodiment by a method for producing a surface structure on at least a part of a surface of a plastic component.

Through the use of ultrashort pulsed lasers, a so-called cold material removal can occur. If the pulse is in the range of $\leq$20 picoseconds at a concurrent high light intensity, then material is removed without melt formation. The physical limit of ultrashort pulses (USP) results from the thermal diffusion depth and the optical penetration depth delta (for USP: d<delta). Thus, the term USP can be regarded as material-specific. In metals, about 1 ps. Thus, structures up to a resolution limit of the laser focus—in practice 10 to 20 microns—are possible. This way, tool steels for inserts that are used in an injection molding process can be structured in a controlled manner. This enables, as was shown in studies already, the molding on the plastic component when using a suitable geometric design. Likewise, direct structuring of at least a part of the surface of the plastic component would clearly also be conceivable. However, this is much more expensive because each plastic component would have to be individually structured.

According to an embodiment of the invention, a thermoplastic plastic component having a surface structure is formed to achieve friction reduction (at least initial friction, e.g., stiction) of the plastic component with a further friction partner. After the injection molding process, at least a part of the surface of the plastic component displays a plurality of structure types in each case arranged in a straight line. A distance is provided between two adjacent straight lines of the structure type which is in the range of 10 microns to 1 mm. A width of the structure types arranged in the straight line is in the range of 10 microns to 1 mm, in particular in the range of 10 microns to 100 microns. A height and/or depth of the structure types arranged in the straight line is in the range of 1 micron to 100 microns.

This structuring of at least a portion of the surface of a thermoplastic plastic component results in an advantageous manner in a modified, overall low friction with respect to unstructured reference surfaces on the plastic component. These structured surfaces have very low static friction, which is explained by the fact that the structuring has the effect of reducing the contact surface. Due to the reduction of the contact surface of the plastic component, the adhesive friction is reduced at the outset of the load, which initially results in very low friction. The friction is thus lower than in a comparable plastic part made with a machining tool. After a few cycles, the structured layer abrades and forms a lubricating film on the surface of the plastic component, which approximately shows the friction of a plastic component in the retracted state, which was manufactured with the polished tool. The invention precisely provides the advantage of reducing or setting the initial friction by structuring the surface of a plastic component in combination with an advantageous friction end value. The initial friction may correspond approximately to the friction in the retracted state, or be set even considerably lower by suitably structuring and forming the structures on the surface of the plastic component.

In accordance with an embodiment, the thermoplastic plastic component may be designed such that with the structure types formed in the surface, the distance, the width, or the height within the structure are constant. Equally, the surface structure can be made up of dimples, so that the distance, width or depth of the structure types within the structure are constant.

According to an embodiment, the surface structure of the thermoplastic plastic component may be designed such that the distance, the width or the height, in protruding structures, vary within the structure. In an analogous manner, this also applies to surface structures having structure types that have formed dimples. Here, the distance, width or depth of the structural types also vary within the structure.

As already mentioned above, the structures on the surface of the thermoplastic plastic component may be raised or depressed. According to an embodiment of the invention, the structure type is formed with a solid line or several individual lines juxtaposed in the straight line, or has a plurality of spots that are juxtaposed in the straight line. Mixed forms of the structure types may also be formed on the surface of the thermoplastic plastic component. The only condition is that the different structure types always be arranged along a straight line.

It is likewise conceivable for several lines to be arranged in a certain homogeneous order on the surface of a plastic component. A possible further embodiment of the invention is that the structure type may be made of a juxtaposition of spots of a certain diameter. The multiple spots are arranged in each case in a straight line. According to an embodiment, the spots can be lined up to each other such that they essentially form a line of juxtaposed spots.

The surface structure of the plastic component may be designed such that the structure types on the surface of the plastic component are oriented at an angle of −90° to +90° with respect to a load direction of the plastic component. It should be noted that the distribution of the structure types and their orientation on the surface is homogeneous. According to another embodiment, it is also conceivable that the distribution of the structure types and their orientation on the surface of the plastic component is statistical.

According to the invention, a method for generating a surface structure in at least a portion of a surface of a thermoplastic plastic component in an injection molding process is also disclosed. In the method, first, a negative surface structure, to be produced in the plastic component, in a surface of an insert for a tool for producing a plastic component in the injection molding process is formed with a pulsed laser. The insert for manufacturing a plastic component is substantially used with an injection mold so that the plastic component is generated by means of molding. By molding the plastic component with the insert, the surface structure is formed on the surface of the plastic component. The surface of the plastic component carries a plurality of structure types each arranged in a straight line. The structure type formed by the injection molding process can be formed by a solid line, a plurality of individual juxtaposed lines or a series of spots. It would also be conceivable that a surface structure can be formed with the pulsed laser directly in at least a portion of the surface of the plastic component. Regardless of whether an insert is first structured with a pulsed laser, or whether the plastic component is structured directly with the pulsed laser, a structured surface is obtained in which a distance between two adjacent, straight lines of structure types is formed in at least one portion of the surface of the injection molded plastic component, which is in the range of 10 microns to 1 mm. Analogously, structure types are obtained having a width in at least a part of the surface of the injection molded plastic component, wherein the width is in the range of 10 microns to 1 mm. According to a preferred embodiment, the width of the structure types in at least a part of the surface of the plastic component is in the range of 10 microns to 100 microns. Similarly, depending on the structure of the insert, one can obtain solid lines, a juxtaposition of individual lines extending in a straight line or a juxtaposition of spots running in a straight line, which have a height or a depth in at least a portion of the surface of the injection molded plastic component, and wherein the thus formed height or depth is in the range of 1 micron to 100 microns.

According to an embodiment of the invention, when forming the negative surface structure in the tool for producing the plastic component by means of the injection molding process, the pulsed laser is controlled such in at least a part of the surface of the plastic component that the distance, the width or the height and the distance, the width or the depth of the structure types within the structure are constant on the surface of the plastic component.

According to an embodiment of the invention, the pulsed laser is controlled such in at least part of the surface of the plastic component when forming the lines or the series of spots that the distance, the width or the height and the distance, width or the depth of the structure types of the structure are constant on the surface of the plastic component.

According to an embodiment of the method, when forming the negative surface structure in the insert for the tool for the manufacture of the plastic component in the injection molding process, in at least part of the surface of the plastic component, the pulsed laser can also be controlled such that the distance, the width or the height or the distance, the width or the depth of the structure types within the structure vary on the surface of the plastic component.

According to an embodiment of the method, likewise the pulsed laser can be controlled such when forming the surface structure in at least a part of the surface of the plastic component, that the distance, the width or the height or the distance as well as the width or depth of the structure types vary on the surface of the plastic component.

According to an embodiment of the invention, the pulsed laser can be controlled such when forming the negative surface structure for the structure types in at least part of the surface of the plastic component that the structure types on the surface of the plastic component are raised or recessed.

According to an embodiment of the invention, the pulsed laser can be controlled such in at least a part of the surface of the injection molded plastic component when forming the negative surface structures or when forming the surface structure, that the structure types (solid lines or the lines juxtaposed in a line or the spots juxtaposed in a line) are oriented on the surface of the injection molded plastic component at an angle of $-90°$ to $+90°$ with respect to a load direction of the plastic component.

In the method according to the invention, it is of advantage if the structure types (solid lines or the lines juxtaposed in a line or the spots juxtaposed in a line) arranged along straight lines have an orientation that runs along a flow direction of the thermoplastic plastic to be filled in the injection molding process. This has the advantage that the very fine lines or spots of the juxtaposition of spots, as described above, are filled during the injection molding process. The formation of shadows and air pockets is avoided.

The advantage of the structure types (solid lines or the lines juxtaposed in a line or the spots juxtaposed in a line), which, as already mentioned, are introduced in the in tool steel in the micrometer range by laser technology and are then molded, is the reduced initial friction. The plastic components formed or molded exhibit a defined surface structure and a different friction behavior against a reference sample (friction partner). Adhesive friction portions, and thus above all the adhesive and initial friction of a tribological system, can be reduced. A balancing between the initial friction and the friction in the retracted state (e.g., at about 50 load cycles) can be achieved with the design of the surface structure.

Although the following description of possible embodiments of the structure types illustrates lines or spots, this shall not be construed as a limitation of the invention to these types of structures. The structures are designed in such a way that they can be molded using an injection molding process. With spot-shaped structures it should be noted that depending on their size, these can be difficult to fill in the injection molding process (air pockets). In line structures, an alignment along the flow direction of the plastic used for filling appears to be advantageous in order to avoid air pockets. Overall, all those types of structures can be used which are suitable for high-quality molding in the injection molding process.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
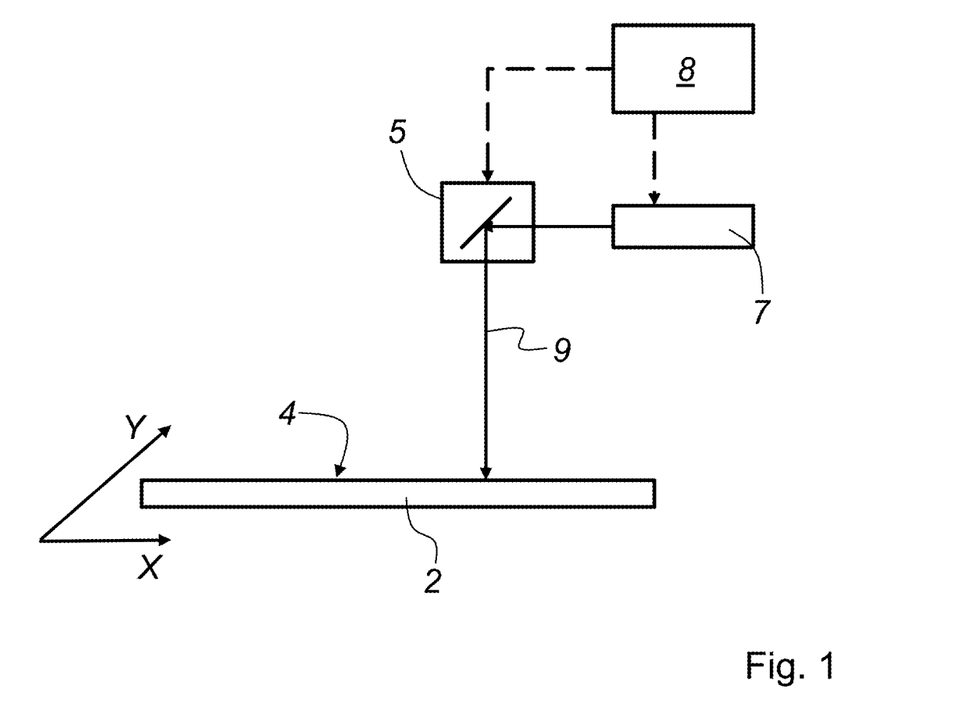
FIG. 1 is a schematic representation of an arrangement with which structures are written in an insert for an injection mold by means of a pulsed laser.
Figure 7:
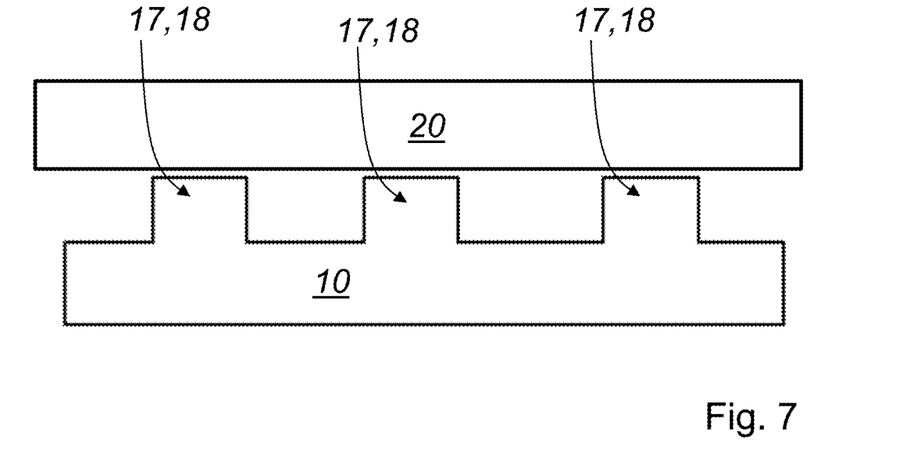
FIG. 7 is a schematic assignment of the plastic component structured according to the present invention with respect to a friction partner.

FIG. 1 shows a schematic view of an arrangement with which microstructures can be introduced in the surface 4 of an insert 2 for an injection mold (not shown here) for manufacturing a plastic component 10 (see FIG. 7). For the structuring of the surface 4 of the insert 2, a pulsed laser 7 is used. Preferred in this context is a pulse duration of the laser 7 between 10 and 20 picoseconds and that the pulsed laser beam 9 striking the surface 4 has a high light intensity. In order to write the dimples (not shown here) in the surface 4 of the insert 2 (in the molded plastic component 10, microstructured protrusions 15 are formed as a result; see FIGS. 4A and 5A) or to remove material from the surface 4 of the insert 2 (in the molded plastic component 10, consequently microstructured dimples 16 are formed; see FIGS. 4B and 5B), a relative movement between the surface 4 of the insert 2 and the pulsed laser beam 9 striking the surface 4 of the insert 2 must exist. One way to achieve this is a scanning device 5 with which the pulsed laser beam 9 is deflected in the X-direction X and in the Y-direction Y on the surface 4 of the insert 2 so as to write the dimples (not shown here). How the pulsed laser beam 9 is to be deflected on the surface 4 of the insert 2 is controlled by a controller 8. It is also possible that with the pulsed laser 7, a direct structuring of a plastic component may be carried out. In this case, material is accordingly removed from the surface of the plastic component with the laser 7 so that structures 13 required for friction reduction can form on the surface 4 of the plastics component 10.

FIGS. 2A to 2F show different variants of the arrangement of the structures 13 on the surface 12 of the thermoplastic plastic component 10. The structures 13 on the surface 12 of the thermoplastic plastic component 10 may be solid lines 17 and/or a juxtaposition of individual lines 17 and/or a series of separate spots 18 (see FIG. 3A). A spot 18 in the sense of the invention is understood to be a geometric shape which substantially has a circular shape and is not too large. The structures 13 on the surface 12 of the thermoplastic plastic component 10 are substantially arranged along a straight line L. The straight lines L are spaced at a distance a from each other. It is also conceivable that the distance a between the straight lines L of the individual structures 13 may be varied. The distance a is thus not constant across the part of the surface 12 of the plastic component 10 that is at least structured. By varying the distance a between the straight lines L of the structures 13, the initial frictional value can thus also be specifically set.

In FIG. 2A to 2F, different orientations of structures 13 (of a single structure/structure type) are shown with respect to a load direction 19 with a further friction partner (not shown here).

Figures 2A, 2B:
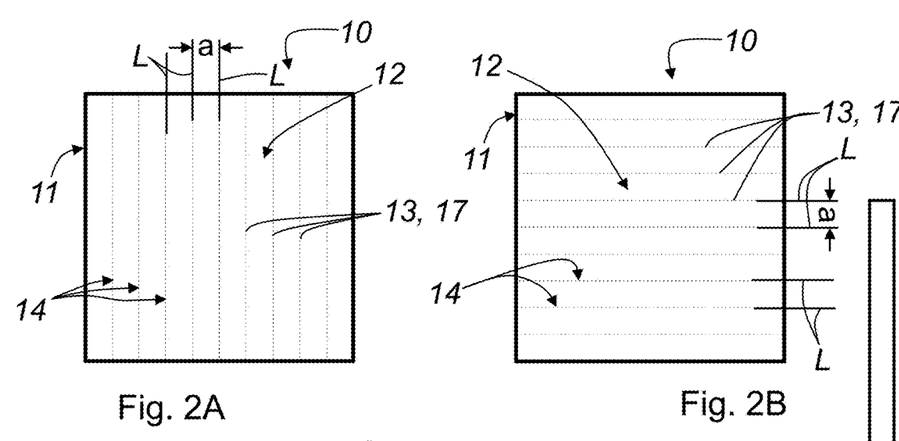
FIGS. 2A to 2F illustrate several variants of the orientation of the structures on the surface of a plastic component with respect to a load direction with another friction partner.
Figures 2C, 2D:
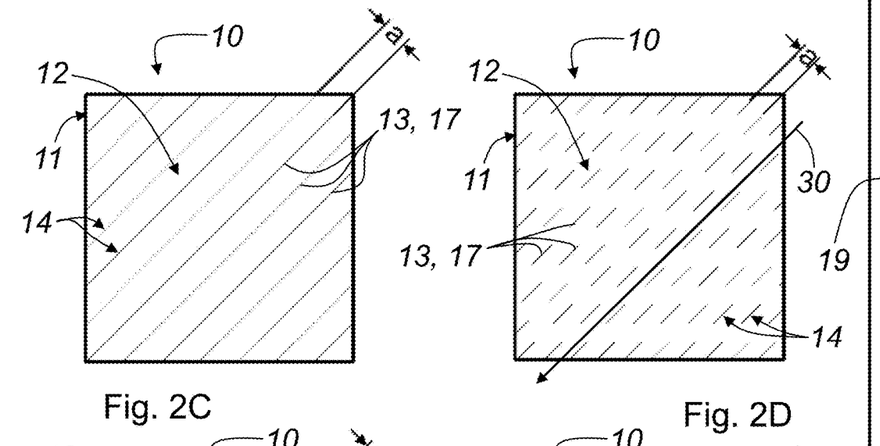
Figures 2E, 2F:
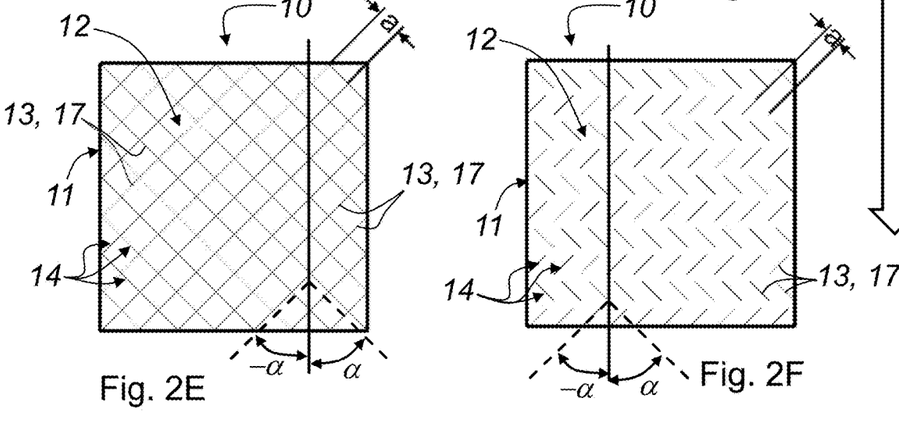

The structure type 14 used in FIG. 2A to 2F is formed as a line 17. In the embodiment of the surface structure 11 illustrated in FIG. 2A, the lines extend 17 toward the load direction 19. The embodiment of the surface structure 11 shown in FIG. 2B is designed such that the lines 17 of the surface structure 11 extend perpendicular to the load direction 19. In the embodiment shown in FIG. 2C, the lines 17 of the surface structure 11 extend at an angle to the load direction 19. In the embodiment shown in FIG. 2D, the surface structure 11 is designed such that individual lines 17 of the surface structure 11 are oriented along a preferred direction 30 corresponding to the straight line L. The individual lines 17 are mutually spaced apart along the straight line L. According to a further embodiment, as shown in FIG. 2E, the lines 17 of the surface structure 11 are inclined at an angle $\alpha$ and $-\alpha$ with respect to the load direction 19. The individual lines 17 of the surface structure 11 intersect there. In the embodiment illustrated in FIG. 2F, the surface structure 11 of the plastic component 10 is designed such that the individual lines 17 are inclined analogous to the representation shown in FIG. 2E, also at an angle $\alpha$ and $-\alpha$ with respect to the load direction 19. The individual lines 17 of the surface structure 11 shown here are mutually spaced apart along the straight line.

Figure 3A:
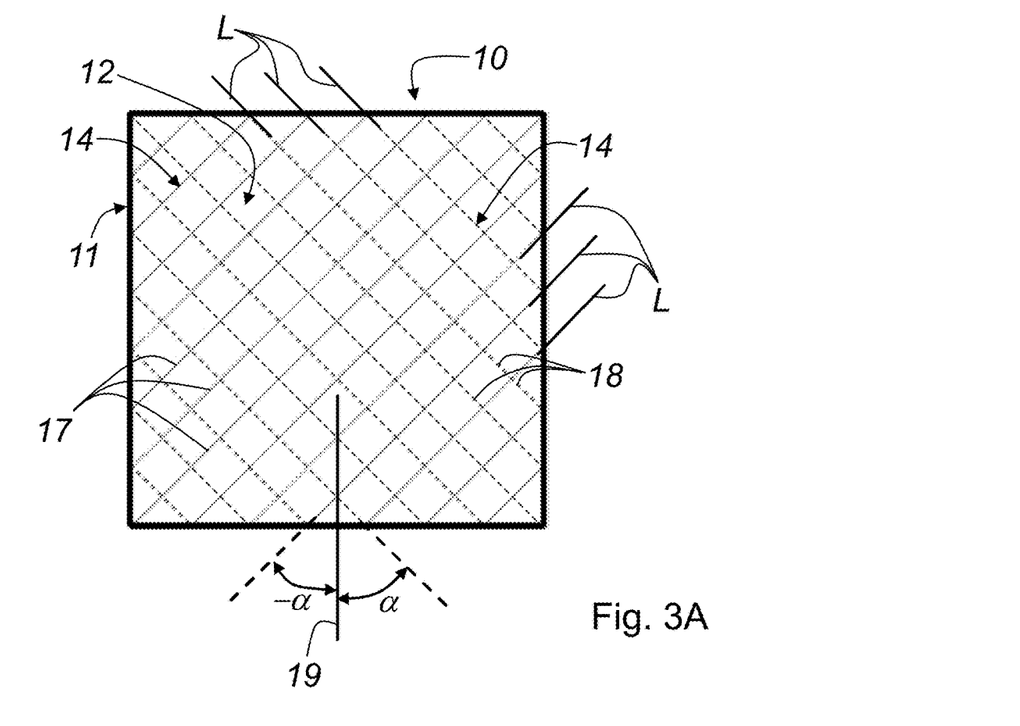
FIGS. 3A to 3B illustrate possible combinations and arrangements of two different structure types on the surface of a plastic component.
Figure 3B:
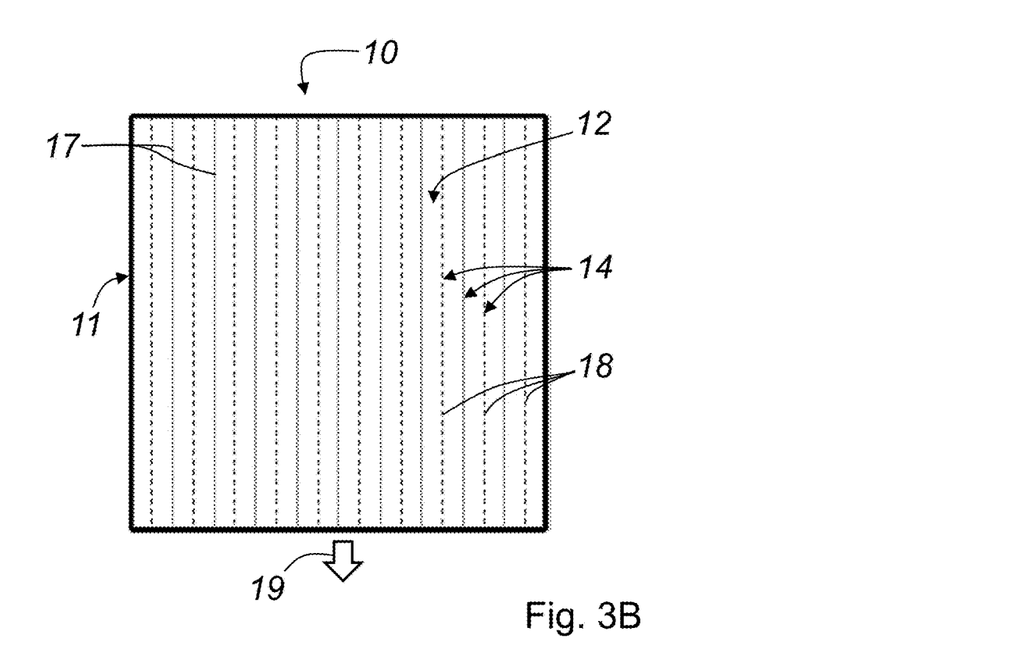

In FIGS. 3A and 3B, combination structures are shown, which means that the surface structures 11 of the thermoplastic plastic component 10 are composed of a combination of at least two different structure types 14. In the embodiment shown in FIG. 3A, a structure type 14 is formed with lines 17. The other structure type 14 is comprised of a plurality of spots 18, which are arranged linearly juxtaposed along the straight line L. The structure types 14 are arranged on the surface 12 of the plastic component 10 such that they are in contact with one another. The lines 17 are arranged at an angle $-\alpha$ to the load direction 19 and the juxtaposed spots 18 are arranged at an angle $\alpha$ to the load direction 19. In the representation shown in FIG. 3B, two different structure types 14 are also formed on the surface 12 of the plastic component 10. As already mentioned in the description of FIG. 3A, a structure type 14 in the shape of lines 17 is formed; the other structure type 14 is designed in the shape of a series of spots 18. Both structure types 14 are arranged parallel to each other in the embodiment shown in FIG. 3B, and are oriented toward the load direction 19.

The embodiment shown in FIG. 3A represents an advantageous combination of the different structure types 14 because the structure types 14 made up of the lines 17 and the juxtaposition of the spots 18 are in contact with one another and are inclined at an angle in each case of α or −α with respect to the load direction 19. In comparison to the representation shown in FIG. 3B, this does not lead to any catching in the loading of the plastic component 10 in the load direction 19 labeled with respect to a friction partner (not shown here). Although in FIGS. 3A and 3B only two possible embodiments of the combination of two different structure types 14 are shown, this is not intended to be a limitation of the invention. A variety of alignments and orientations of the different structure types 14 with respect to the load direction 19 are conceivable. Precisely by configuring the surface structure 11 on the surface 12 of a thermoplastic plastic component 10 in different ways, it is possible to achieve the optimum adaptation of the plastic component 10 with respect to the desired initial friction (with the first load cycles).

Figure 4A:
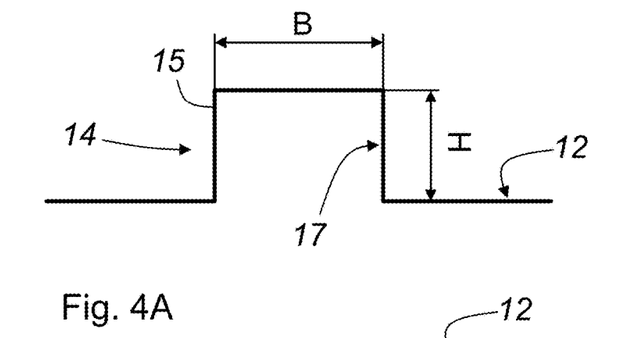
FIGS. 4A to 4B illustrate the formation of the line structures on the surface of a plastic component, wherein the line structures may be protrusions or dimples.
Figure 4B:
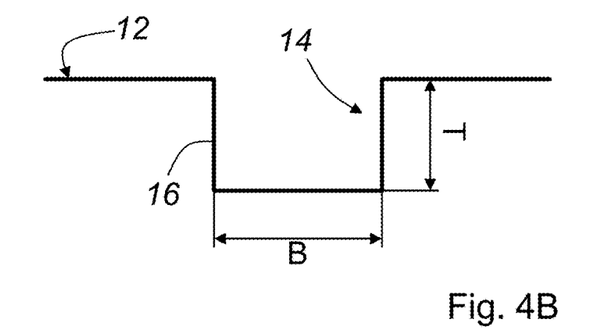

FIGS. 4A and 4B illustrate the formation of structure types 14, which are formed as lines 17 on the surface 12 of the plastic component 10. In FIG. 4A, the line 17 (or part of a line) is a protrusion 15 which has a width B and a height H. The width of the line 17 can range from 10 microns to 100 microns. The height of the line 17 can be in the range of 1 microns to 100 microns. In the embodiment shown in FIG. 4, the line 17 is formed as a dimple 16 starting from the surface 12 of the plastic component 10. The dimple 16 thereby has a depth T, which is in the range of 1 microns to 100 microns. The width B of the dimple 16 is in the range of 10 microns to 100 microns.

Figure 5A:
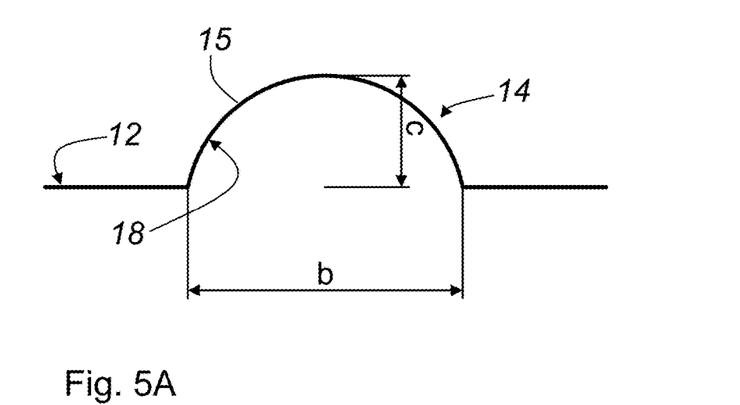
FIGS. 5A to 5B illustrate the formation of a further structure type, which is formed as a spot and may also be formed on the surface of a plastic component in the form of a protrusion or a dimple.
Figure 5B:
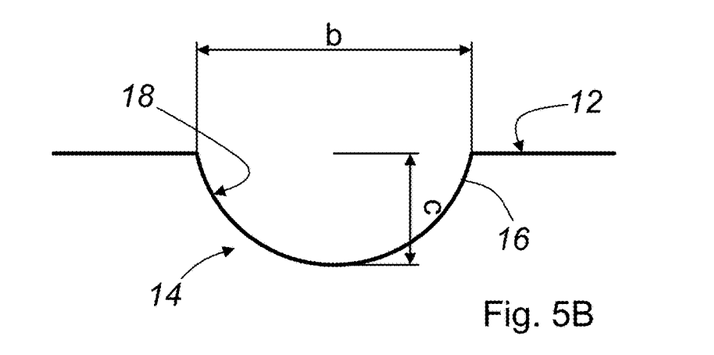

FIG. 5A and FIG. 5B show the structure type 14, which is formed as a spot 18 in the shape of a protrusion 15 or a dimple 16 with respect to the surface 12 of the plastic component 10. As already illustrated in the description of FIGS. 3A and 3B, the individual spots 18 can be arranged juxtaposed in a line.

The spots 18 are substantially circular and have a width B which is in the range between 10 microns and 100 microns. If the spot 18 is formed as a protrusion 15, it has a height H which is in the range from 1 micron to 100 microns. In the event that the spot 18 is formed as a dimple 16, it has a depth T which is analog in the range between 1 micron and 100 microns. The structure types 14, which can form, e.g., a line 17 or a series of spots 18, which may extend over a certain part of the surface 12 of the plastic component 10, can be designed according to the invention such that within the structure 13, the parameters, such as the distance a of the structures 13 to one another, the width B, the height H or the depth T along the structure, may vary. The variation of these parameters ranges within the above described range of values.

The structures 13, which are formed in the surface 12 of a plastic component 10, result from the fact that in an insert 2 (see FIG. 6) for an injection mold 1 (see FIG. 6) for the manufacture of a plastic component 10, these structures 13 are introduced into the insert 2 in a negative mold. The plastic component 10 can then be molded in an injection molding process, together with the surface structure 11. Possibly, the injection molding process may be supplemented with a variothermal process. The individual structures 13 can be utilized in meaningful combinations. The only thing to be considered is that a catching of the two structures 13 during the movement in respect of the load direction 19 should be avoided.

Figure 6:
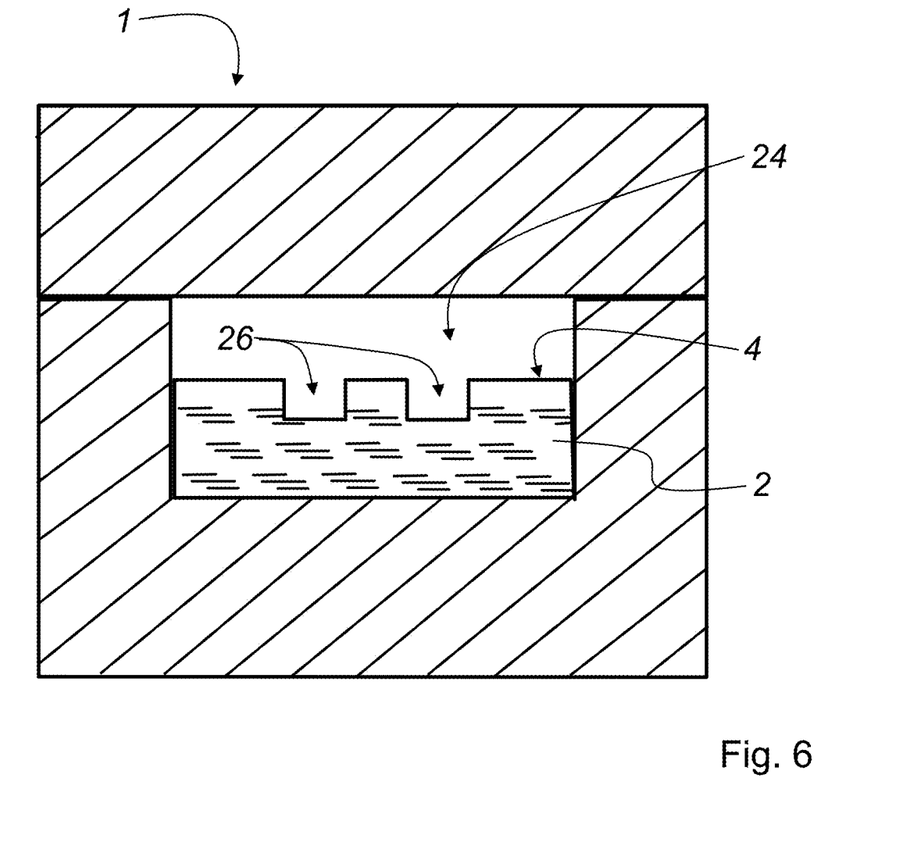
FIG. 6 is a schematic representation of the tool in section, incorporating the insert designed according to the invention.

FIG. 6 shows a schematic view of the injection mold 1, with which an injection molded component can be produced. The insert 2 is introduced in the injection mold 1. Between the insert 2 and the injection mold 1 is a free space 24, which can be filled during the injection molding process with the plastic (thermoplastics) used for the injection molding process. The structures produced with the pulsed laser 7 in the surface 4 of the insert 2 for the injection mold 1 are dimples 26 (line, series of lines, or series of spots), which alternate. The dimples 26 in the surface 4 of the insert 2 thus represent the negative mold of the plastic component (not shown) that is ultimately produced.

FIG. 7 shows a schematic view of the interaction of the plastic component 10 produced according to the invention with a friction partner 20. The plastic component 10 injection-molded with the aid of the insert 2 has a line 17, a series of lines 17 and/or a series of spots 18, which are in contact with the friction partner 20. The lines 17, the series of lines 17 and/or the series of spots 18 reduce the initial friction (stiction) between the plastic component 10 and the friction partner 20.

Figure 8A:
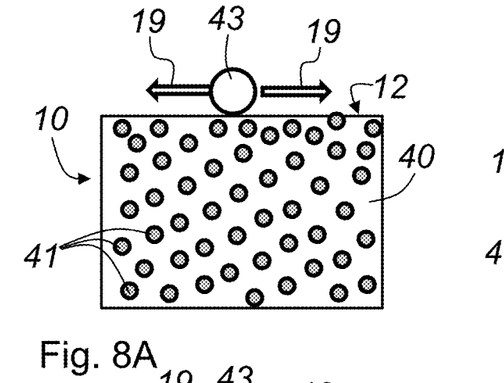
FIGS. 8A to 8B illustrate the state of a plastic component, which is provided with an additive, in the initial state and in the retracted state.
Figure 8B:
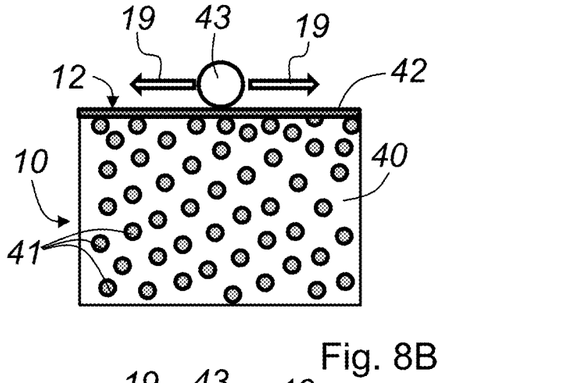

FIGS. 8A and 8B show the position of a conventional plastic component 10 in a starting position and in the retracted state (after a specified number of load cycles). For reducing the friction with a friction partner 20, which is guided along a load direction 19 across the surface 12 of the plastic component 10, the plastic component 10 is provided with a slip additive 41. The slip additive 41 is substantially homogeneously distributed in the base material 40 of the plastic component 10. In the position illustrated in FIG. 6A, the initial friction has an increased value since the slip additive 41 is not yet released on the surface 12 of the plastic component 10. In the position shown in FIG. 6B, a lubricating film 42 is formed on the surface 12 of the plastic component 10 after a plurality of load cycles (retracted state). With this design of the lubricating film 42, a reduction in friction is thus achieved, which levels off to a specified constant value (see FIG. 8).

Figures 9A, 9B:
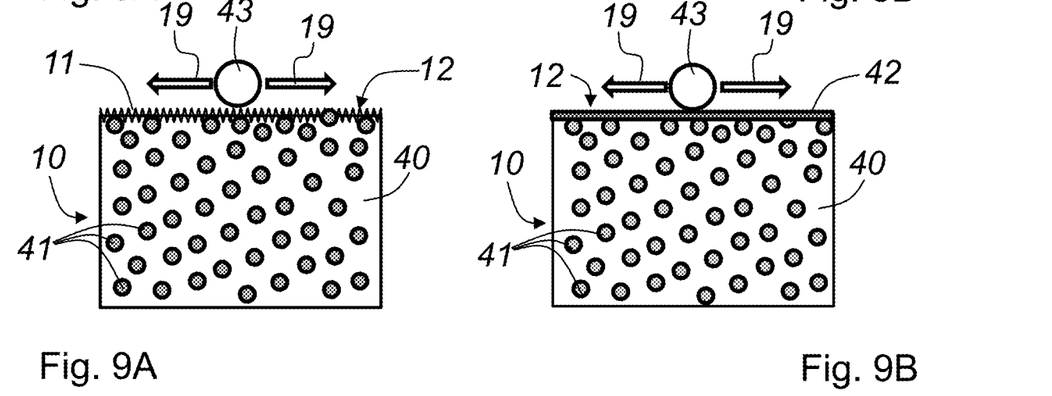
FIGS. 9A to 9B illustrate the state of a plastic component, which is also provided with an additive, and which has formed a surface structure on the surface, and the corresponding state, also in the retracted state.

In the embodiment shown in FIGS. 9A and 9B, the plastic component 10 is formed of the base material 40 and the added slip additive 41. According to the invention, in the representation in FIG. 7A, the surface structure 11 is formed on the surface 12 of the plastic component 10, which ensures a low adhesive initial friction between the plastic component 10 and the friction partner 20 along the load direction 19. As can be seen in FIG. 7B, after a certain number of load cycles, the surface structure 11 is abraded and a lubricating film 42 has formed on the surface 12 of the plastic component 10. By means of this lubricating film 42, a friction value is also set which ultimately reaches a value which corresponds to the range value of a plastic component 10, which, analogous to the embodiment in FIGS. 6A and 6B, at least before the start of the load cycle, has not formed a surface structure 11.

Figure 10:
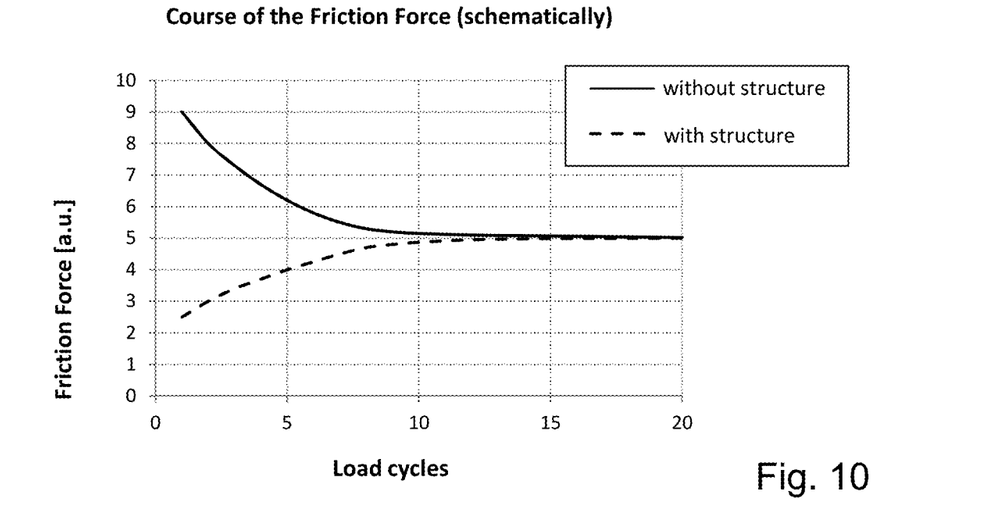
FIG. 10 is a function of the friction force dependent on the number of load cycles for a plastic component with or without surface structuring.

FIG. 10 illustrates the course of the friction force in dependence with the load cycles between the friction partners 20 and the plastic component 10. The dashed line 51 displays the friction force dependent on the number of load cycles, which occurs in a plastic component 10 that has formed a surface structure 11 in accordance with the invention. The solid line 52 reflects the course of the friction force as a function of the number of load cycles for a conventional plastic component 10 (without the inventive surface structure 11). From FIG. 10, it can be clearly seen that the initial friction is reduced in a plastic component 10 with a surface structure 11 according to the invention. After a certain number of load cycles, the friction force aligns with the friction force of the conventional plastic component 10. In both cases, a lubricating film 42 (see FIGS. 6B and 7B) forms on the surface 12 of the plastic component 10 after a certain number of load cycles so that in both cases (conventional plastic component 10 and plastic component 10 with a surface structure 11 on the surface 12), the same friction conditions can be achieved after a certain number of load cycles.

The plastic component 10 with the surface structure 11 is formed of a thermoplastic. The friction partner 20 can also be a thermoplastic. Another type of material, such as for example glass or a metallic component, is also conceivable. Usually, the plastic component 10 and the friction partner 20 are made of a thermoplastic. The materials of the plastic component 10 or of the friction partner 20 may be the same or different. Normally, two different materials are provided since mutually identical materials for the plastic component 10 and the friction partner 20 exhibit increased friction.

Especially in practice, two types of loading between the plastic component 10 and the friction partner can 20 occur. For example, there may be a few or only one load cycle between the plastic component 10 and the friction partner 20. This may be the case, e.g., when removing a cap from a disposable product. As is apparent from the illustration in FIG. 8, in this case, the surface structure 11 can lower the operating force and possibly avoid an additive. Wear of the structure 13 on the surface 12 of the plastic component does not interfere.

However, a more frequent application is that many load cycles are executed between the plastic component 10 and the friction partner 20. This is the case, e.g., with lancing devices or inhalers. In the first application, these products often exhibit a slightly more sluggish operation. The structuring according to the invention can counteract this sluggishness and achieve a more uniform operating force of all duty cycles.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing a surface structure in at least a portion of a surface of a thermoplastic plastic component in an injection molding process, the method comprising:
    forming, with a pulsed laser, a negative surface structure of a surface structure to be formed on the plastic component in a surface of an insert for a tool for manufacturing the plastic component in an injection molding process, and
    molding the plastic component with the insert thereby forming the surface structure on the surface of the plastic component, the surface structure including several structure types each arranged in a straight line such that the structure types are abraded during use of the plastic component to form a lubricating film on the surface of the plastic component,
    wherein a distance between two adjacent straight lines of the structure types in at least a part of the surface of the injection molded plastic component is in a range of 10 microns to 1 mm,
    wherein a width of the structure types arranged in the straight line in at least a portion of the surface of the injection molded plastic component is in the range from 10 microns to 1 mm, and
    wherein a height or depth of the structure types arranged in the straight line in at least a part of the surface of the injection molded plastic component is in the range from 1 micron to 100 microns.

2. The method according to claim 1, wherein, when forming the negative surface structure in the tool for producing the plastic component in the injection molding process in at least a part of the surface of the plastic component, the pulsed laser is controlled such that the distance, the width or the height of the structure types arranged in the straight line or the distance, the width or the depth of the structure types arranged in the straight line vary or are constant at the surface of the plastic component.

3. The method according to claim 1, wherein the structure types arranged in the straight line have an orientation which is aligned in a flow direction of the thermoplastic plastic in the injection molding process.

4. The method according to claim 1, wherein the pulsed laser is controlled such when forming the negative surface structure of the insert that the structure type is a solid line.

5. The method according to claim 1, wherein the pulsed laser is controlled such when forming the negative surface structure of the insert that the structure type is a plurality of lines juxtaposed in the straight line.

6. The method according to claim 1, wherein the pulsed laser is controlled such when forming the negative surface structure of the insert that the structure type is a plurality of spots juxtaposed in the straight line.

7. The method according to claim 1, wherein the pulsed laser is controlled such when forming the negative surface structure in the insert that the structure types on the surface of the plastic component are oriented at an angle of −90° to +90° with respect to a load direction of the plastic component.

8. The method according to claim 1, wherein a friction partner rubbed against the plastic component is a thermoplastic, glass or metallic component.

9. The method according to claim 1, wherein the pulsed laser is an ultrashort pulsed laser and a physical limit of ultrashort pulses results from a thermal diffusion depth and an optical penetration depth of the pulsed laser.

10. The method according to claim 1, wherein a pulse duration of the pulsed laser is between 10 and 20 picoseconds, and a pulsed laser beam of the pulsed laser, that is incident on the surface of the insert, has a high light intensity.

* * * * *